US005212517A

United States Patent [19]

Yamada et al.

[11] Patent Number: 5,212,517

[45] Date of Patent: May 18, 1993

[54] COPIER HAVING COPY MODE SELECTION MEANS

[75] Inventors: Yasushi Yamada; Tsuyoshi Mizubata; Masaru Ushio; Osamu Murata; Tomoya Motoyoshi; Yoshikazu Maekawa; Masanobu Kawano, all of Tokyo, Japan

[73] Assignee: Konica Corporation, Tokyo, Japan

[21] Appl. No.: 812,818

[22] Filed: Dec. 24, 1991

[30] Foreign Application Priority Data

Dec. 28, 1990 [JP] Japan .................................. 2-417100
Dec. 28, 1990 [JP] Japan .................................. 2-417101
Dec. 28, 1990 [JP] Japan .................................. 2-417102

[51] Int. Cl.[5] ........................ G03B 27/32; G03B 27/52

[52] U.S. Cl. ........................................ 355/24; 355/26; 355/320; 355/313

[58] Field of Search ...................... 355/23, 24, 26, 318, 355/319, 320, 313

[56] References Cited

U.S. PATENT DOCUMENTS 4,466,733 8/1984 Pels .................................... 355/319

*Primary Examiner*—Monroe H. Hayes

*Attorney, Agent, or Firm*—Finnegan, Henderson, Farabow, Garrett & Dunner

[57] ABSTRACT

The invention provides a copying apparatus for producing a required number of copy sets of two-sided copy from document sheets of an original by selecting one of ADF mode in which the required number of copy sets are produced simultaneously and RDH mode in which the required number of copy sets are produced one set by one set.

11 Claims, 8 Drawing Sheets

COPIER HAVING COPY MODE SELECTION MEANS

BACKGROUND OF THE INVENTION

The present invention relates to improvements in a copier having a sorter, by which images can be transferred onto both sides of a recording paper.

In general, this kind of copier comprises: a document feeder which feeds an uppermost or lowermost document stacked on a document tray onto a platen glass and returns the document to the tray after predetermined processing so as to be fed again; and an intermediate tray on which recording papers are stacked. The document image is recorded on one side of the recording paper, and when the lowermost recording paper on the intermediate tray is fed to a transfer section, it is reversed, so that images on one side of the document can be recorded onto one side or both sides of the recording paper. In this copier, when a document feeder in which a document can be reversed is utilized, document images on both sides can be recorded on one side or both sides of a recording paper.

After the aforementioned image forming operation, the recording paper is sorted by a sorter provided to one side of the copier.

In a two-sided copying operation by the aforementioned conventional copier, two kinds of processing modes are known, which are determined according to document conveyance procedure and recording paper reversal procedure.

The form and time characteristics of the aforementioned two modes will be explained as follows.

For simplification, explanation will be made under the conditions that a document image is provided only on one side, and that the following are already known: the number of documents (the number of pages) is 2M; and the number of sets of copied papers is N.

There is a difference in the conveyance procedure of a document and that of a recording paper depending whether the number of documents is odd or even. However, this difference is not essential to the present invention, so the following explanation will be made under the condition that the number is even.

FIRST MODE (ADF MODE)

The copying procedure of this mode is described as follows (FIG. 2).

(1) First, the lowermost document (the page number of which is 2M) is fed onto a platen glass from a document tray, and then a document image is transferred onto the surface of a recording sheet. This transfer operation is carried out N times, that is the number of volumes. Accordingly, N sheets of recording paper on which an image has been formed, are stacked on an intermediate tray of an ADF.

(2) After the document placed on the platen glass has been discharged, the lowermost paper on the document tray (page 2M -1) is fed onto the surface of the platen glass, and at the same time, the recording paper on the intermediate tray, on one side of which an image has already been formed, is reversed and fed during a period of time, referred to hereinafter as "switching time", so that an image can be transferred. The aforementioned operation is repeated N times and N sheets of copied paper are respectively discharged onto N portions of a sorter.

In this case, the aforementioned switching time is waste time which is defined as follows. After an image has been transferred onto the first side of a recording paper, another image is transferred onto the reverse side of the paper. In this case, the lowermost recording paper on the intermediate tray, on which the image has already been formed on one side, is reversed and fed to the transfer section. The aforementioned operation time is defined as waste time. This switching time is an important factor which influences the efficiency of the copy operation.

(3) The aforementioned operations (1) and (2) are repeated M times so that images are formed on both sides of all documents. In the manner described above, two-sided copies of page 2M, of which the number of sets is N, are completed.

In the aforementioned ADF mode, one page of the document is copied N times to obtain N sets of copies. Accordingly, the ADF mode is effective when a large number of copied paper sets of a document having a small number of pages needs to be copied, so that the copy operation can be conducted at high speed. In spite of the aforementioned advantage, the ADF mode has the following disadvantages. Since all volumes are simultaneously made in parallel, it is inconvenient to obtain only one volume, before completion of others. Since the number of pages is M, the number of switching time is M. Accordingly, when the number of pages is large, it takes a long time.

SECOND MODE (RDH MODE)

A copy operation of this mode will be described as follows (FIG. 2–FIG. 8).

(1) First, the lowermost document on the document tray is fed onto the surface of the platen glass, and the final page (2M) of the document is copied onto the first side of only one recording sheet which has been conveyed from a paper feeding section. The copied recording paper is accommodated on the intermediate tray.

(2) After the document (page 2M) on the platen glass has been discharged, the next document (page 2M-1) is not copied and discharged, and the next document (page 2M-2) is fed onto the surface of the platen glass. Then, the image is formed on the surface of only one recording sheet, on both sides of which images have not been formed yet. After that, the recording paper is accommodated on the tray of the intermediate tray unit.

The aforementioned operations (1) and (2) are repeated M times, so that every other document on the document tray is copied from page 2M to page 1. As a result, recording papers are stacked on the intermediate tray, on which images of pages 2M, 2M-2, 2M-4 . . . , 4, and 2 are copied in order from the lower side.

(3) After that, the recording papers on the intermediate tray, on which an image has already been formed on one side, are switched over, and every other page of the document, which are odd number pages of the document are copied. As a result, a volume of two-sided copies, the page numbers of which are serial, can be obtained. That is, the lowermost document (2M page) on the document stack is not copied and discharged, and the next document (2M-1 page) is fed onto the surface of the platen glass. Then, the image is recorded on a recording paper which is conveyed from the lowermost portion of the intermediate tray and reversed, onto which the image of 2M page has been already recorded. After that, the recording paper is discharged to the sorter. When the aforementioned operation is conducted M times, two-sided copies in which all pages are serially copied, are completed in the sorter.

Further, when the aforementioned operations (1)-(3) are repeated N times, N volumes of two-sided copies, the number of pages of which is 2M, are completed.

According to the aforementioned RDH mode, one volume of two-sided copies can be made one by one, so that a small number of copied paper sets can be quickly obtained. Further, when a small number of copied paper sets with a large number of pages are copied, the efficiency is high (the number of switching operations is small), so that the operation can be performed at high speed.

In spite of the aforementioned advantages, there is a drawback in that the number of switching operations is increased in proportion to number N of the number of copied paper sets, so that the more the number of the copied paper sets is, the worse the efficiency becomes.

As described above, the ADF mode (the first mode) and the RDH mode (the second mode) respectively have advantages and disadvantages, so that it is desirable to select a suitable mode according to the circumstances.

SUMMARY OF THE INVENTION

With reference to the aforementioned points, an object of the present invention is to provide a copier in which merits of both the ADF mode and RDH mode are utilized and both modes are appropriately selected so that a high speed and high performance operation can be conducted.

In order to accomplish the aforementioned object, the first structure of the present invention comprises a mode selecting means which selects a first or second mode to operate a copier according to the mode most suitable for a copy condition, wherein the first and second modes are defined as follows.

In a copier having a sorter comprising a document feeder in which a document stacked on a document tray installed in the upper portion of the copier, is fed onto a platen glass one by one from the uppermost or the lowermost document on a document stack, and the document is returned from the platen glass to the document stack opposite to the delivery side so as to be fed again, and comprising an intermediate stack unit in which a recording paper, on which a document image has been formed on one side, is stacked on an intermediate tray from the upper side and is then reversed and conveyed to a transfer section, from the lowermost paper of the stack, the first mode is conducted as follows: when at least one two-sided copy is made from at least one document, after the required number of recording papers have the same document page copied on one side, the next document page is copied on the reverse side of each recording paper to make a two-sided copy. The second mode is conducted as follows: after every other document has been copied from the first or final page onto recording papers, the recording paper is fed again from the lowermost paper, to copy the remaining every other document onto the reverse side of the recording paper so as to make two-sided copies with serial page numbers; and the aforementioned operation is repeated until a target number of sets of copied papers can be made.

The second structure of the present invention is described as follows: the aforementioned document feeder is composed in such a manner that two-sided documents are reversed and conveyed; and a mode can be selected for two-sided copies to be made from two-sided documents.

The third structure of the present invention is described as follows: in the aforementioned first and second structures, the aforementioned mode selecting means selects a mode in accordance with the number of sets of copies, so that simple and efficient mode selection can be performed.

The fourth structure may be composed in such a manner that: in the aforementioned third structure, the aforementioned mode selection means can automatically select the copy mode in accordance with the number of the documents and the number of copied paper sets.

The fifth structure may be composed in such a manner that: in the aforementioned third structure, a means to manually input the number of documents is provided to the aforementioned copier body, and the aforementioned mode selection means selects a copy mode according to the number of the documents and the number of copied paper sets.

DETAILED DESCRIPTION OF THE PREFERRED EMBODIMENTS

Figure 1:
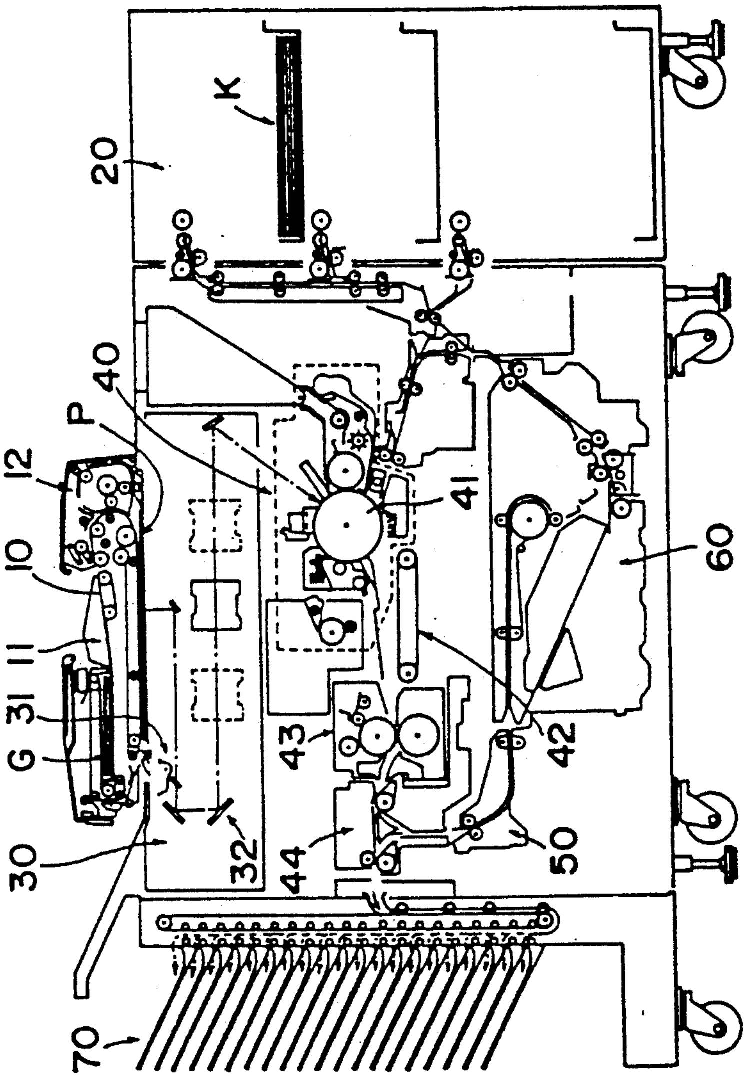
FIG. 1 is a sectional view showing the entire structure of the copier of the present invention.
Figure 2:
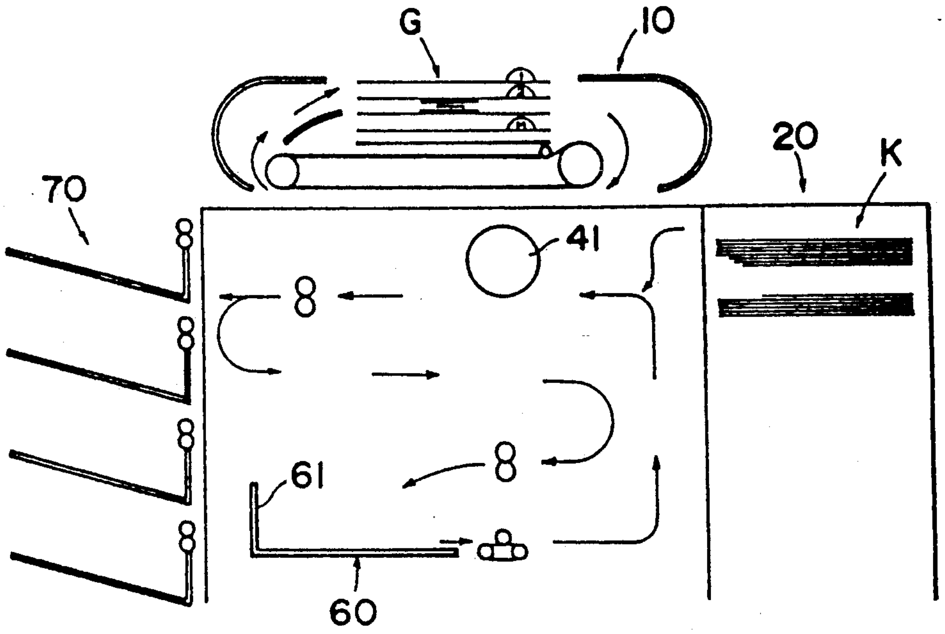
FIG. 2 is a schematic illustration showing the principle of the first step of the ADF mode (the first mode)
Figure 3:
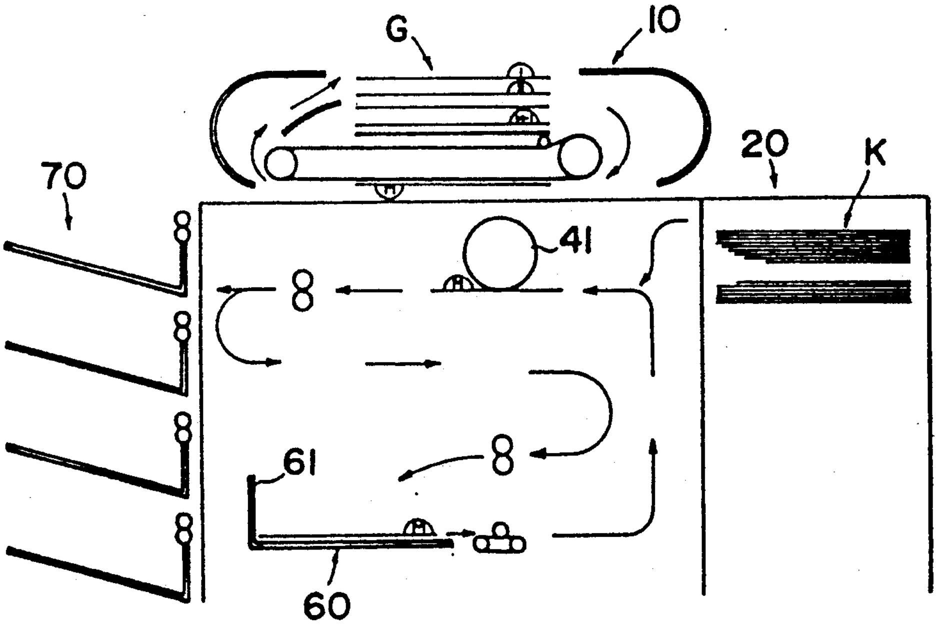
FIG. 3 is a schematic illustration showing the principle of the second step of the ADF mode (the first mode)
Figure 4:
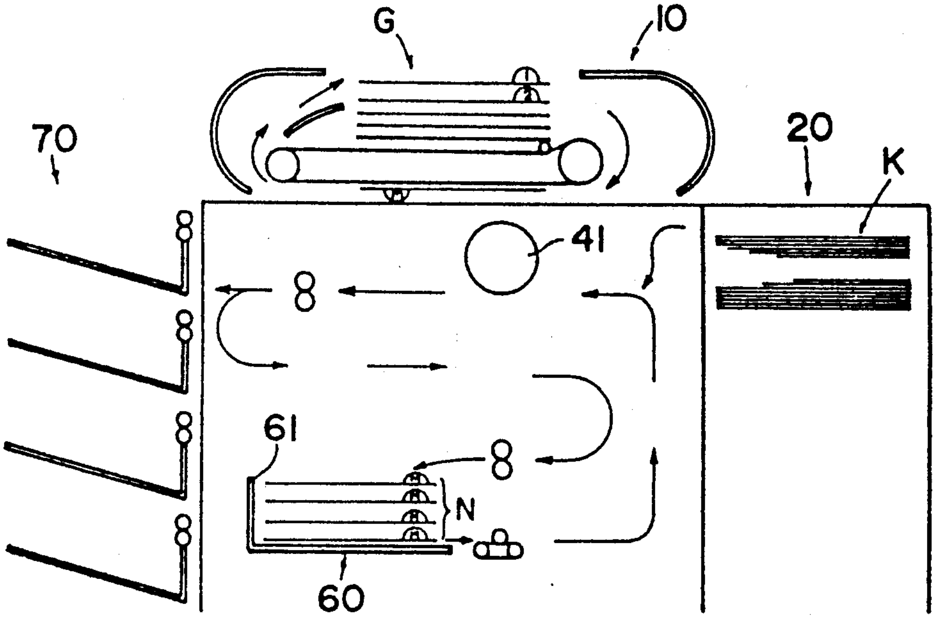
FIG. 4 is a schematic illustration showing the principle of the third step of the ADF mode (the first mode)
Figure 5:
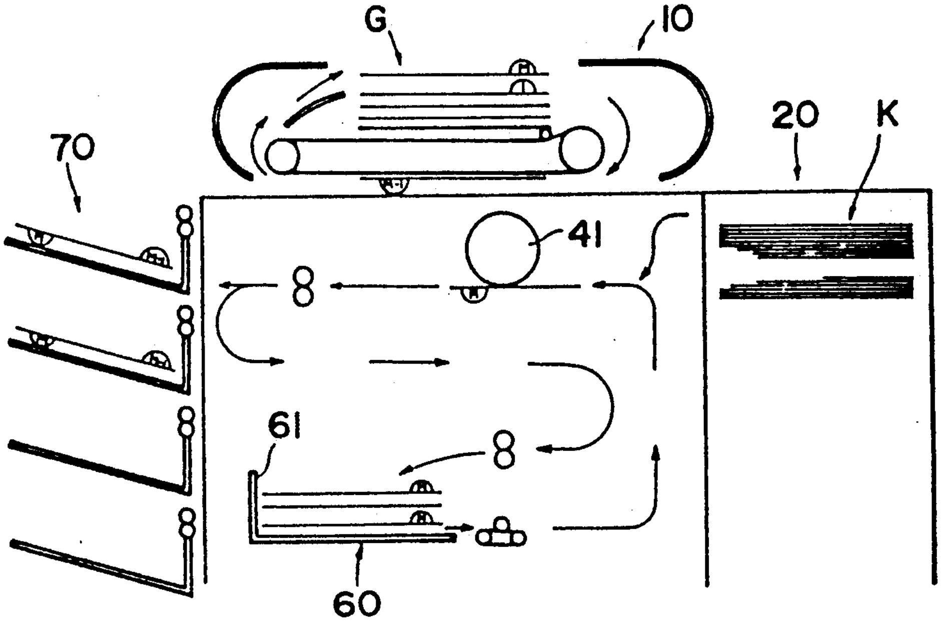
FIG. 5 is a schematic illustration showing the principle of the fourth step of the ADF mode (the first mode)
Figure 6:
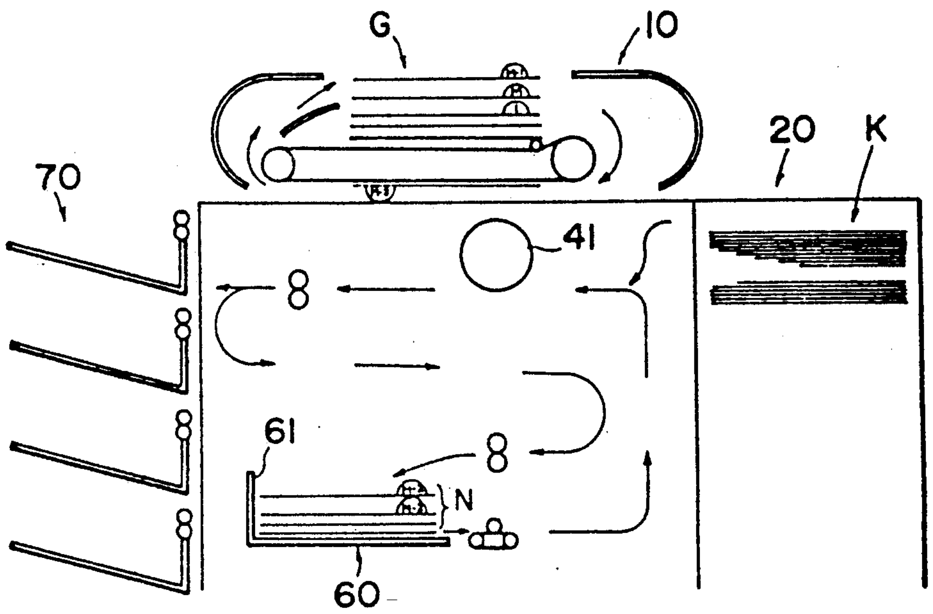
FIG. 6 is a schematic illustration showing the principle of the fifth step of the ADF mode (the first mode)
Figure 7:
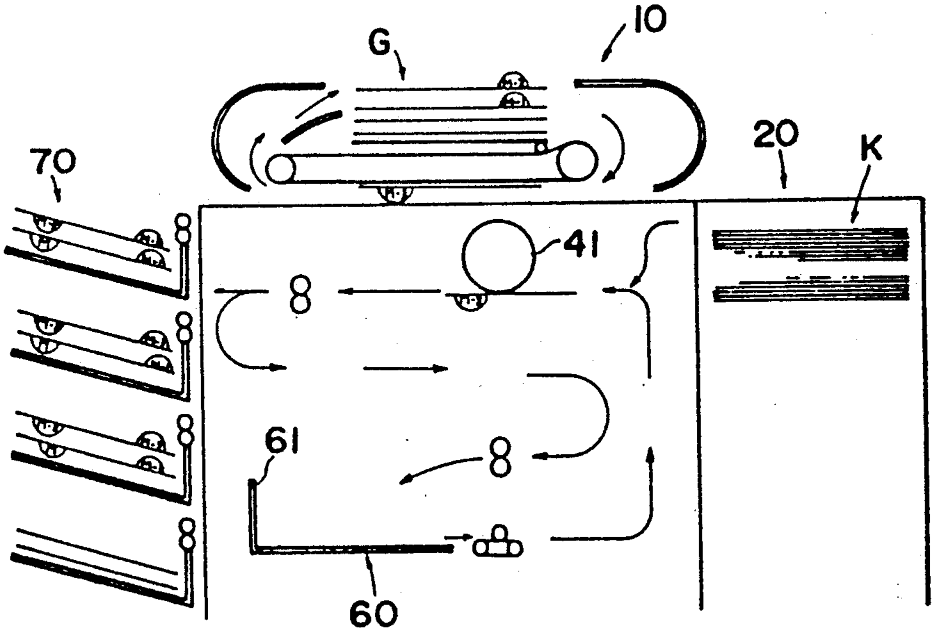
FIG. 7 is a schematic illustration showing the principle of the sixth step of the ADF mode (the first mode)
Figure 8:
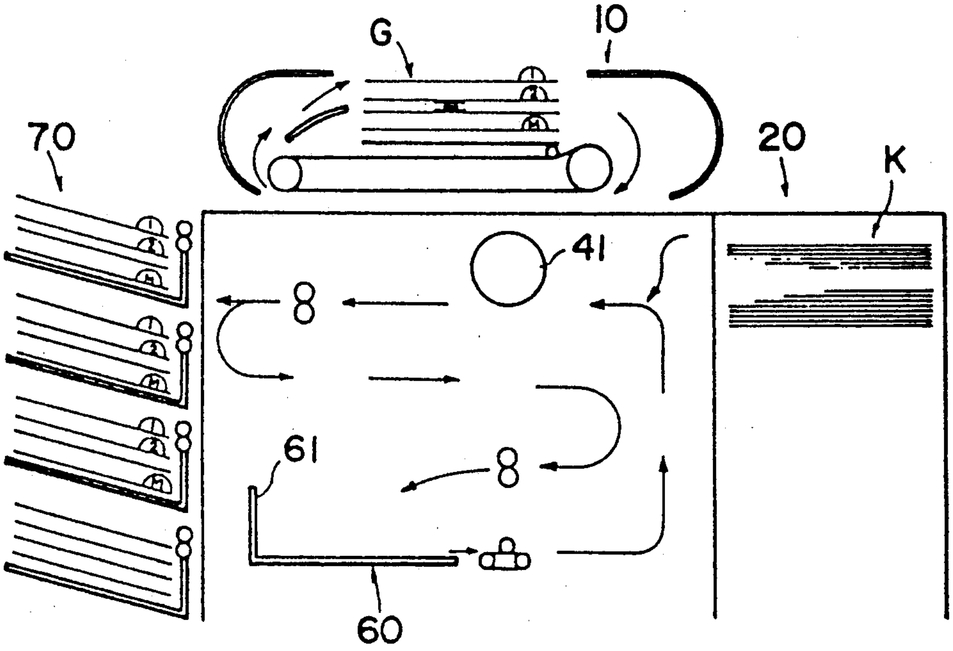
FIG. 8 is a schematic illustration showing the principle of the seventh step of the ADF mode (the first mode)
Figure 9:
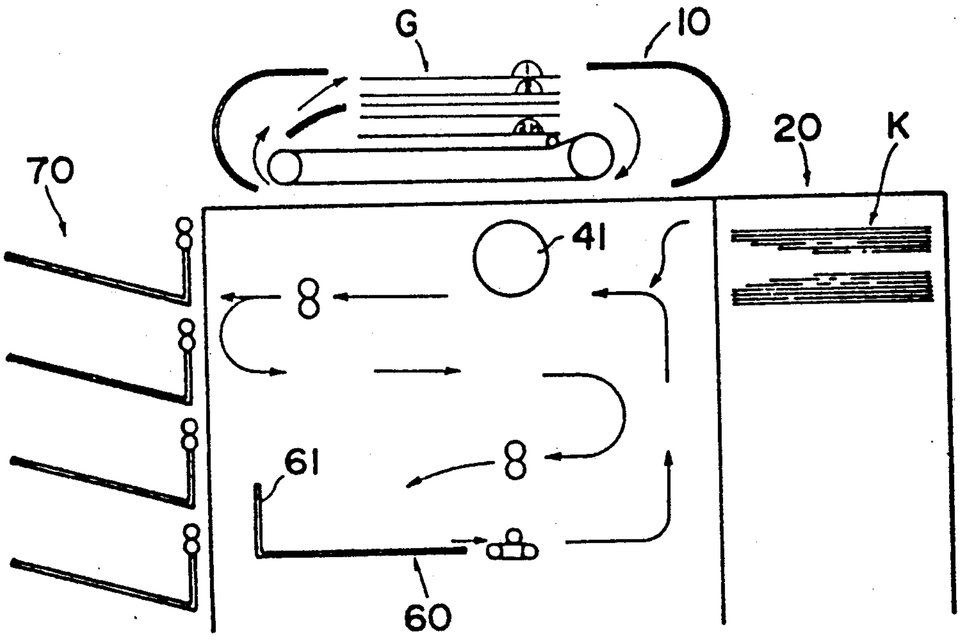
FIG. 9 is a schematic illustration showing the principle of the first step of the RDH mode (the second mode)
Figure 10:
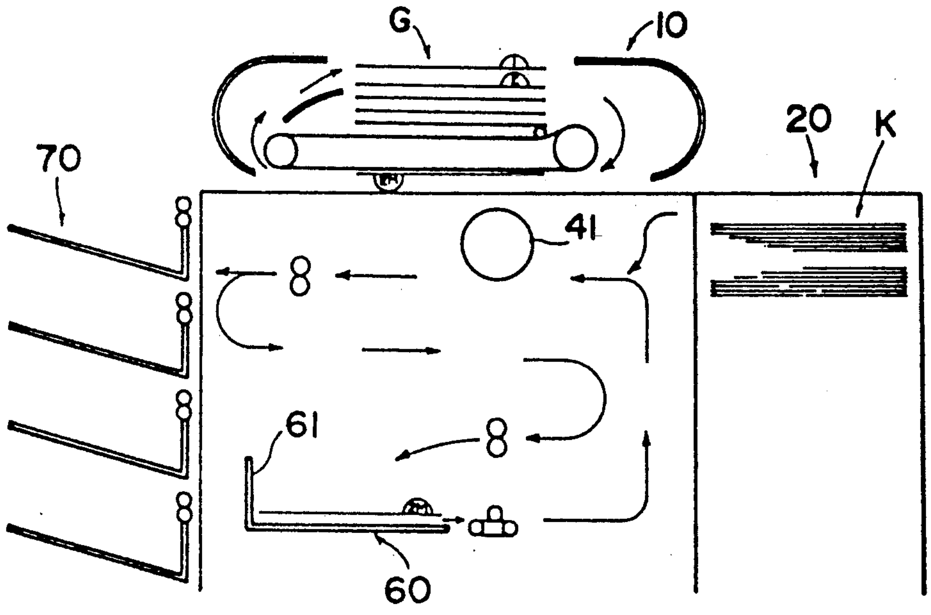
FIG. 10 is a schematic illustration showing the principle of the second step of the RDH mode (the second mode)
Figure 11:
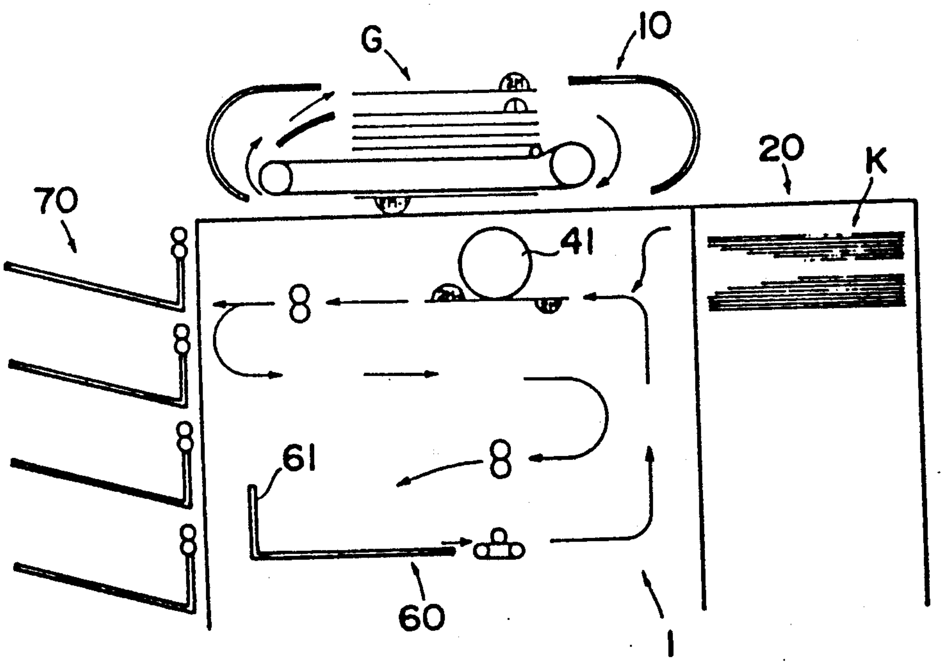
FIG. 11 is a schematic illustration showing the principle of the third step of the RDH mode (the second mode)
Figure 12:
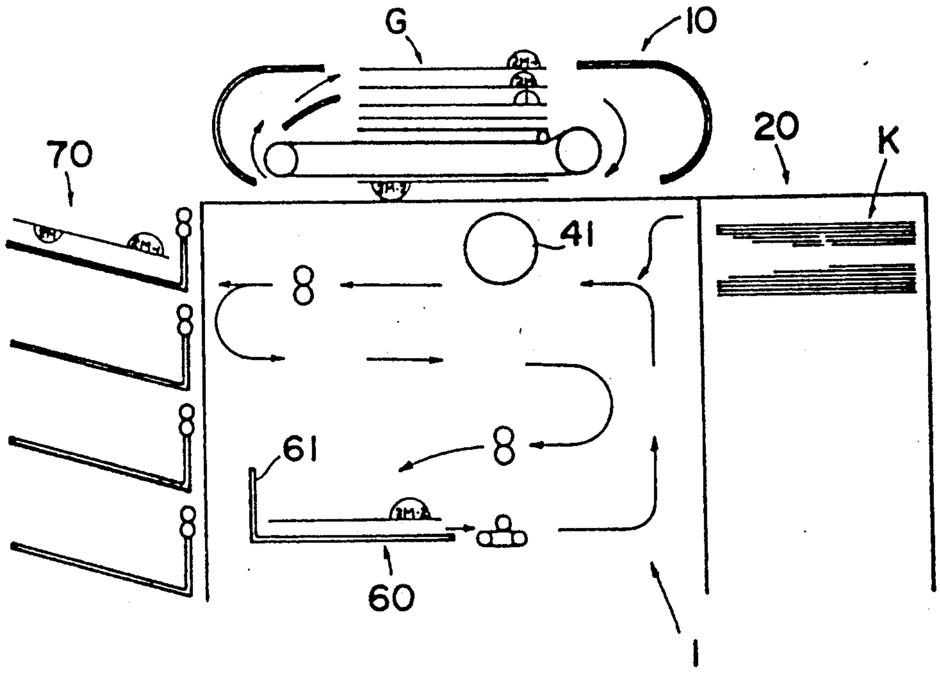
FIG. 12 is a schematic illustration showing the principle of the fourth step of the RDH mode (the second mode)
Figure 13:
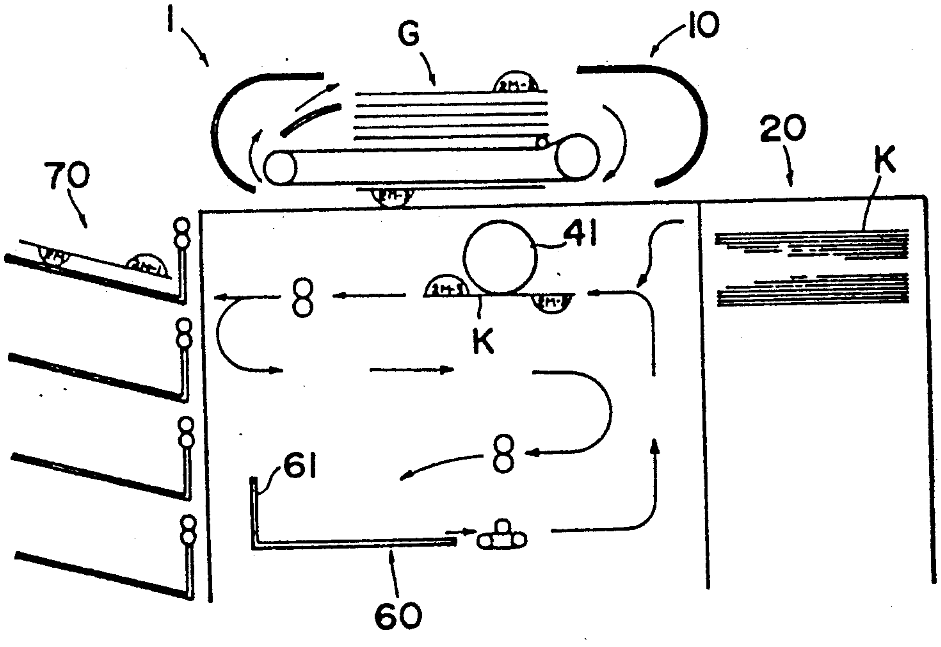
FIG. 13 is a schematic illustration showing the principle of the fifth step of the RDH mode (the second mode)
Figure 14:
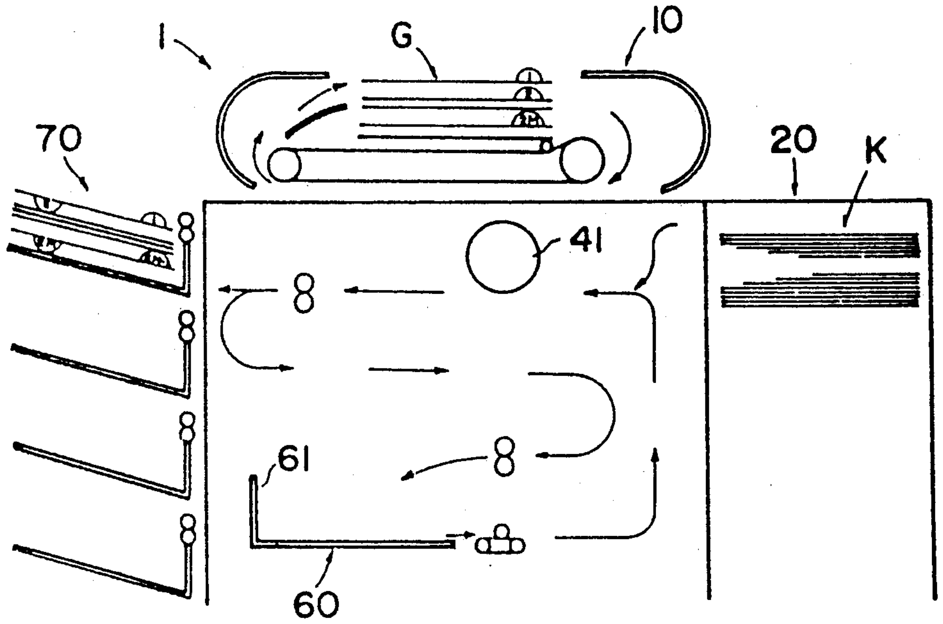
FIG. 14 is a schematic illustration showing the principle of the sixth step of the RDH mode (the second mode)

Before the explanation of the preferred embodiments, how the processing time of the aforementioned ADF mode (the first mode) and that of the RDH mode (the second mode) changes in accordance with the number of documents and the number of copy sets, will be explained as follows.

(1) One-sided document→Two-sided copy

In this case, the number of documents is set to be even (=2M) for the reason of simplification. However, in the case of an odd number, the principle of mode selection is the same. The number of copy sets is set to be N.

In the case of ADF mode

Switching is performed M times, so that the total necessary time T1 to make all copies can be expressed by the following equation:

$$T_1=2M\times N\times t_1+M\times t_a \quad (1)$$

where
Copy speed $=t_1$
Switching time $=t_a$.

In the case of RDH mode

In this mode, every other document is copied, so that the copy speed of this mode is slower than that of the ADF mode, and expressed as follows.

Copy speed $=t_2(t_2>t_1)$

In this case, the time of switching conducted every N sheets is expressed as follows:

Switching time $=t_a$.

It is the same as that in the ADF mode, so that necessary time $T_2$ to make all the copies can be expressed as follows:

$$\begin{aligned} T_2 &= (2\times 2M\times t_2+t_a)\times N \quad (2) \\ &= 4M\times N\times t_2+N\times t_a. \end{aligned}$$

When the values of M and N are given, the mode which can process a copy operation fastest is judged by the difference between $T_1$ and $T_2$ obtained by the above equations (1) and (2). The aforementioned difference $T_2-T_1$ can be expressed as follows:

$$T_2-T_1=4M\times N\times t_2+N\times t_a-(2M\times N\times t_1+M\times t_a)=2(M-\alpha)(N-\beta)+\gamma$$

where $\alpha$, $\beta$ and $\gamma$ are constants.

Consequently, a characteristic curve showing which mode can process faster, the ADF mode or the RDH mode, is obtained from the above equation in the first quadrant when the quadrant is divided by a hyperbola.

When the number of copy sets is $1<N\leqq N_0(N=5)$ in the characteristic diagram, which mode can process faster largely depends on the number 2M of documents.

When number of documents is $5\leqq 2M$, the RDH mode is a little advantageous, and when $M<5$, the ADF mode is a little advantageous.

On the other hand, when $N_0<N$, the ADF mode is advantageous, having no relation with the number of documents.

As described above, from the viewpoint of processing time, which mode is more advantageous, the ADF mode or the RDE mode, can be judged by a predetermined algorithm. However, both modes are affected by other factors apart from the processing time.

Therefore, in this embodiment, the copy mode is selected, giving consideration to other factors except for the processing time.

(2) [Two-sided document→Two-sided copy]

In this case, the number of documents is set to be an even number. However, even if an odd number is adopted in the same manner as in the case of one-sided document→two-sided copy, no difference is caused. In this embodiment, the number of documents is set to be M' (the number of pages is 2M'), and the number of copy sets is set to be N.

In the case of the ADF mode

Since the document reversal time is M' and the switching operation is conducted every M' sheets, time $T_3$ necessary for making all copies is expressed as follows:

$$T_3=2M'\times N\times t_1\times M'\times t_r+M'\times t_a \quad (3)$$

where copy speed $=t_1$, document reversal time $=t_r$, and switching time $=t_a$.

In the case of the RDH mode

In this mode, every other one-sided document is copied, so that the copy speed is slower than that of the ADF mode. However, in the case of a two-sided document, the copy operation can be conducted continuously (every other page is copied), so that the copy speed is $t_1$, and the switching time per one sheet is $t_a$, which are the same as those in the ADF mode.

However, when a page of an odd number is copied, the document is reversed once before a transfer operation, and after transfer, the document must be further reversed. Accordingly, time $T_4$ necessary for making all copy sets can be expressed as follows:

$$T4=[(t1+2t_r)\times M'+t_1\times M'+t_a]\times N=M'Nt_1+2M'Nt_r+Nt_a \quad (4)$$

Consequently, the difference in processing time between two copy modes in the case of two-sided documents, can be expressed as follows:

$$T_4-T_3=M'Nt_1+2M't_{r+Nta}-(2M'Nt_1+M't_r+M't_a=2M'Nt_r+Nt_a-M't_r-M't_a=2(M'-\alpha')(N-\beta')+\gamma'$$

This case is essentially the same as the aforementioned case "one-sided document→two-sided copy". and the region dividing characteristic is shown by a hyperbola.

Assume that $t_a=3.0$ sec and $t_r=0.3$ sec. Then, when $N=1$ and $M'=50$, the following results can be obtained;

$T_3=33$ sec $T_4=165$ sec

As shown above, the RDH mode is decidedly advantageous. In the same manner, when $1<M'<50$, the RDH mode is also advantageous.

Next, when $N=3$, in order to be $T_3>T_4$, it is necessary that $6<M'$. Accordingly, when M' is not more than 6, the ADF mode is advantageous, and when M is not less than 7, the RDH mode becomes advantageous.

When $N\geqq 5$ and the upper limit of M' is 50, the following inequality is satisfied whatever the value of M' may be:

$$T_3>T_4$$

Accordingly, it is clear that the ADF mode is always advantageous. In the manner explained above, the characteristic diagram shown in FIG. 15 can be obtained.

Referring now to the attached drawings, an embodiment of the present invention will be explained as follows.

Figure 15:
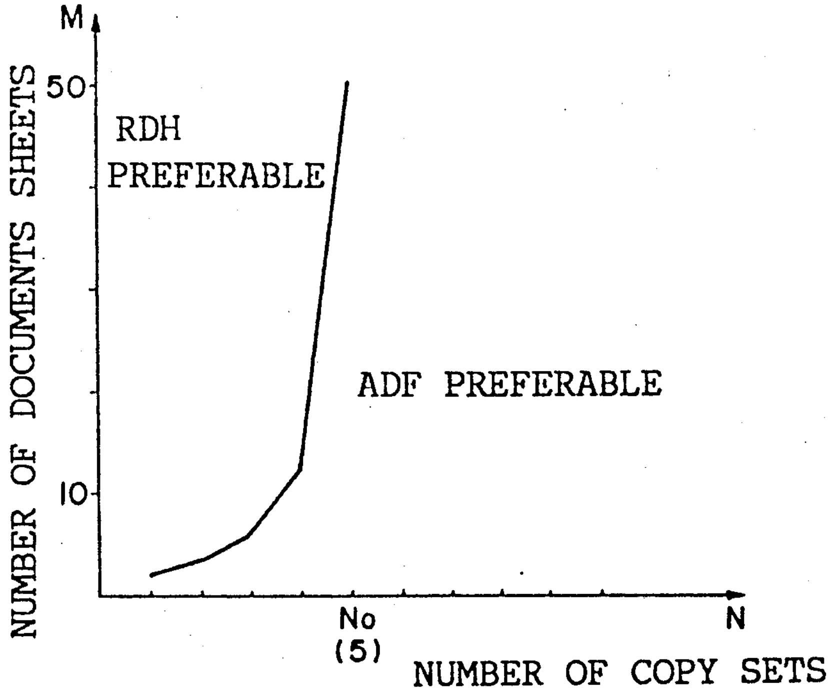
FIG. 15 is a characteristic diagram in which the processing efficiency of the ADF and RDH modes are compared with regard to the number of documents and that of copy sets.

FIG. 1 is a sectional view showing the entire structure of the copier of the present invention, FIGS. 2-8 are schematic illustrations explaining the principle of the ADF mode (the first mode), FIGS. 9-14 are schematic illustrations explaining the principle of the RDH mode (the second mode), and FIG. 15 is a characteristic diagram in which the processing efficiency of the ADF and RDH modes are compared with regard to the number of documents and that of copy sets in the case where two-sided copies are made from one-sided documents.

In FIG. 1, numeral 1 is a copier body of the present invention. A document feeder 10 is provided on platen glass P on an upper portion of the copier body 1, a paper feeder 20 is provided on the paper feeding side of the copier body 1, and a sorter 70 is provided on the paper delivery side of the copier body 1. An optical unit 30, transfer section 40, reversal drive section 50, and intermediate stack unit 60 are respectively provided in predetermined positions in the copier body 1.

The aforementioned document feeder 10 is structured in such a manner that: the lowermost document of documents G stacked on a document tray 11 is successively conveyed onto the aforementioned platen glass P; after an exposure operation has been conducted, the document is discharged; the discharged document is circulated; and the document is returned onto the top of documents G stacked on the document tray 11. When 2M sheets of one-sided documents (the page number is from 1 to 2M) are stacked on the document tray 11, the lowermost document is page 2M, and the uppermost document is the first page, so that the documents are fed in the following order: 2M→ (2M-1)→3 →2→1.

This document feeder 10 is operated as follows: in the case of a one-sided document, the document G is circulated without a reversal operation; and in the case of a two-sided document, after one side of the document has been exposed, it is reversed through a reversal path 12 in accordance with a copy processing mode, and then the document is returned to the document tray 11.

The aforementioned paper feed unit 20 feeds new recording papers, that is, no image has been formed on either side. Various sizes of recording papers accommodated in paper feed stacks are fed to the aforementioned transfer section 40 by the paper feed unit 20.

The aforementioned optical unit 30 irradiates the document placed on platen glass P with a lamp 31. Further, light reflected from the surface of the document is irradiated on a photoreceptor drum 41 of the transfer section 40 through a mirror system 32.

The aforementioned transfer section 40 is structured in such a manner that an electrostatic latent image is formed on the photoreceptor drum 41 with light reflected from document G; the latent image is developed into a toner image; and the toner image is transferred onto an upper surface of a recording paper sent from the aforementioned paper feed unit 20 or an intermediate stack unit 60. The transferred recording paper is fixed by a fixing section 43 and conveyed by a conveyance belt 42. Then, the recording paper is discharged onto a predetermined tray of the sorter 70 while the copied side of the recording paper is kept upward. Otherwise, the recording paper is reversed by the reversal drive section 50, and stacked unit on an intermediate tray of the aforementioned intermediate stack unit 60 while the copied side of the recording paper is kept downward.

Recording papers, on which an image has been formed on one side, are stacked and accommodated on the aforementioned intermediate stack 60, and sent again to the transfer section 40 so that an image can be formed on the reverse side of the recording paper. The intermediate stack unit 60 is structured in such a manner that: a recording paper, the copied side of which is kept downward, is discharged from the reversal drive section 50, and stacked on the intermediate tray 61 successively; and the lowermost stacked recording paper is sent to the aforementioned transfer section 40 one by one. At this time, the recording paper is switched back and sent out in a direction opposite to that in which the recording paper has been conveyed thereto. Therefore, the recording paper is reversed by the conveyance path, so that a side of the recording paper on which an image has not been formed yet, is maintained upward in the transfer section 40. In other words, the side of the recording paper on which an image has not been formed yet, is maintained so that it can face the photoreceptor drum 41.

A mode selecting means (not shown in the drawing) is provided in an appropriate position inside the copier body 1, so that one of the aforementioned ADF mode or RDH mode can be selected in accordance with the number of copy paper sets.

In other words, the mode selecting means is structured in such a manner that when number N of copy paper sets which has been set by an operator, exceeds a predetermined threshold value $N_0$, the copy mode is changed over to the ADF mode. This utilizes a property in which a curve to determine superiority or inferiority of the two modes sharply changes at the predetermined threshold value $N_0$ (for example, $N_0=5$) as shown in FIG. 15.

In other words, since number M of documents to be stacked is limited, the ADF mode (the first mode) is advantageous, having no relation to the number of documents, under the condition that $N_0<N$, wherein N is the number of copied paper sets.

On the other hand, under the condition that $N\leqq N_0$, superiority and inferiority of the two modes change according to number M of the documents. Therefore, the following mode selection methods can be adopted.

(1) Without regard to the number of documents, the RDH mode (the second mode) is selected. Due to the foregoing, there are some disadvantages in the RDH mode. However, a detecting means to detect the number of documents is not necessary, so that a very simple apparatus can be realized. When the number of copied paper sets is not more than $N_0$, the RDH mode is adequate because a complete set of copied papers can be made one after another.

(2) Either the ADF mode or the RDH mode is selected according to the number of documents. In this case, a detecting means to detect the number of documents is necessary, so that the apparatus becomes complicated. However, the processing speed can be always maintained at the maximum.

In both cases (1) and (2), the number of copied paper sets is necessary information to be inputted. Accordingly, when the copy mode is appropriately selected according to the number, a simplified and high-speed copier can be realized.

When documents G are one-sided documents in the aforementioned embodiment, the lowermost document of one-sided documents G stacked on the document tray of the document feeder 10, the page of which is from 1 to 2M, is successively fed one by one so that the document can be placed on platen glass P. On the other hand, a predetermined size of recording paper K is sent out from the transfer section 40. Then, an electrostatic latent image of a document image is formed on the photoreceptor drum of the transfer section 40 by irradiating light of the lamp 31 of the optical unit 30 through the mirror system 32. After the electrostatic latent image has been changed into a toner image, it is transferred onto one side of recording paper K. This recording paper K, on which the image is formed on one side, is stacked on the intermediate tray 61.

At this time, mode selection is conducted as follows: when the set number of paper to be copied exceeds a predetermined threshold value $N_0$, the ADF mode (the first mode) is selected; and when the set number of papers to be copied does not exceed predetermined threshold value $N_0$, either the RDH mode or the ADF mode (the second mode) is selected according to various conditions such as the number of documents.

In the case of the RDH mode, a set of recording papers K onto which images have been transferred, are discharged and stacked on the tray of the sorter 70, and then subsequent sets of recording papers are stacked on the tray in the same manner. In the case of the ADF mode, target sets of recording papers are simultaneously made and stacked on the tray of the sorter 70.

When a set of recording papers K have been discharged into the sorter 70, they can be stapled.

Next, an embodiment will be explained in which a desirable mode can be selected according to the characteristic diagram shown in FIG. 15, giving consideration to the number N of copied paper sets inputted by an operator and the number M of documents detected by an appropriate document number detection means.

In this embodiment, operations are conducted as follows.

First, before the copier 1 starts its copy operation, a number of documents G placed on the document feeder 10 is counted by a document number detection means. The following two forms are utilized for the detection means in this case.

(a) Documents G are circulated by a document feeder in order to count the number of documents G without conducting copy operations.

(b) The number of documents G placed on a document tray is automatically counted.

Although the aforementioned case (a) requires a period of time to circulate the documents, it does not need a special mechanism for counting. Accordingly, case (a) is advantageous in that the structure can be simplified. For that reason, the aforementioned system is adopted for this embodiment, and when a copy start button is pressed, the documents start to be circulated so that the number of the documents can be counted.

Concerning the document number detection means of case (b), for example, the following systems can be adopted: the height of stacked documents is mechanically or optically detected; or the shape of the edge of the stacked documents is mechanically or optically detected. According to the aforementioned system, when documents are set on a document feeder and the number of copied paper sets is inputted, the most appropriate copy mode can be always selected so that the fastest copy operation can be realized.

In the case of $N \leqq N_0$

In this case, superiority and inferiority of the two modes are reversed according to number M of the documents. Therefore, the following mode selection method can be adopted.

Either the ADF mode or the RDH mode is selected according to the number of documents. Although a document number detection means is required in the aforementioned case, it is not necessary to provide a special mechanism when the documents are circulated by the document feeder in the manner described above. Consequently, a high speed copy mode can be always selected.

When documents G are one-sided documents in this embodiment, one-sided documents G, the pages of which are from 1 to 2M, stacked on a document tray, are circulated by the document feeder 10 without conducting a copy operation, so that the number of the documents can be detected. Next, documents G are fed one by one from the lowermost document, page 2M. On the other hand, a predetermined size of recording paper K is sent to the transfer section 40 from the paper feed section 20. Then, an electrostatic latent image of a document image is formed on the photoreceptor drum of the transfer section 40 by irradiating light of the lamp 31 of the optical unit 30 through the mirror system 32. After the electrostatic latent image has been changed into a toner image, it is transferred onto one side of recording paper K. This recording paper K, on which the image is formed on one side, is stacked on the intermediate tray 61.

When the number of copied paper sets which has been set by an operator, exceeds a predetermined threshold value $N_0$, a copy operation of the ADF mode (the first mode) is conducted without regard to the number of the documents. When the number of copied paper sets does not exceed the predetermined threshold value $N_0$, either the RDH mode or the ADF mode (the second mode) is selected in accordance with the characteristic diagram shown in FIG. 15 on the basis of the number of documents and the number of copied paper sets.

Another embodiment can be considered in which a desirable mode is selected in accordance with the number of documents when an operator manually inputs the number of documents.

The aforementioned manually inputting system is composed on the assumption that the number of documents has been already known or the operator counts the number of documents. However, this system is advantageous in that: a special device is not required; and further this system can save time because document circulation to count the number of the documents is not necessary. Therefore, this system is adopted in this embodiment, and not only the number of copied paper sets but also the number of the documents can be manually inputted from an operation panel (not shown) provided on the front of the copier body.

In the case of $N \leqq N_0$

In this case, superiority and inferiority of the two modes vary according to number M of the documents.

The apparatus is structured in such a manner that: either the ADF mode (the first mode) or the RDH mode (the second mode) is selected according to the number of documents. In this case, it is necessary to provide a document number detection means. However, in this embodiment, it is not necessary to circulate the documents by the document feeder and further it is not necessary to provide a special counter, wherein a high speed copy mode can be always selected according to the document number which has been inputted manually by the operator. Of course, the documents may be circulated by the document feeder and a special counter may be provided while the document number is manually inputted. In this case, it is preferable that: when the document number is small, it is inputted manually; and when the document number is large, it is counted by circulating the documents or it is counted by an optical or mechanical detection means.

When documents G are one-sided documents in this embodiment, one-sided documents G, the pages of which are from 1 to 2M, are stacked on a document tray, and at the same time the number of copied paper sets and the number of documents are manually inputted from an operation panel. Next, documents G are fed one by one from the lowermost document, page 2M. On the other hand, a predetermined size of recording paper K is sent to the transfer section 40 from the paper feed section 20. Then, an electrostatic latent image of a document image is formed on the photoreceptor drum of the transfer section 40 by irradiating light of the lamp 31 of the optical unit 30 through the mirror system 32. After the electrostatic latent image has been changed into a toner image, it is transferred onto one side of recording paper K. This recording paper K, on which the image is formed on one side, is stacked on the intermediate tray 61.

When the number of copied paper sets which has been set by an operator, exceeds a predetermined threshold value $N_0$, a copy operation of the ADF mode (the first mode) is conducted without regard to the number of documents. When the number of copied paper sets does not exceed the predetermined threshold value $N_0$, either the RDH mode or the ADF mode (the second mode) is selected in accordance with the characteristic diagram shown in FIG. 15 on the basis of the number of documents and the number of copied paper sets.

Next, a variation of the aforementioned embodiment will be described as follows.

The aforementioned document number detection system (a) is advantageous in that the number of documents can be detected without providing a special counting mechanism, so that the structure can be simplified. In this case, it is possible to detect the number of documents by circulating them before the copy operation, and then to select an appropriate copy mode in accordance with the number of documents and the number of copied paper sets. However, the aforementioned method has a drawback, in that document circulation causes a waste of time for the operator.

Therefore, this embodiment is structured in such a manner that while the number of the documents is being counted, the first set of copied papers are processed in the RDH mode (the second mode). Then, the second and the following sets are automatically processed by the aforementioned first or second mode in accordance with the number of the documents counted in the operation of the first set, and the number of copied paper sets. In the operation according to the aforementioned structure, waiting time is seemingly zero, and a complete set of copies including all pages from the first to the last, can be obtained early.

In principle, an operator should not be concerned with the selection of the copy mode. However, in the case where the RDH mode by which complete copy sets can be made one by one, is desirable even when the number of copied paper sets to be made is large, it is convenient for the operator to select a copy mode arbitrarily. Therefore, a copy mode can be arbitrarily designated by operating a mode selection key provided on an operation panel (not shown) to release the automatic selection of the copy mode.

When the aforementioned manual mode selection means is provided, for example, in the case of a copier in which documents are circulated before a copy operation in order to count the number of the documents, it is possible to omit the document number detecting operation by manually designating the ADF mode in order to make the operation speed faster.

What is claimed is:

1. A copying apparatus for producing a desired number of sets of duplex copy sheets from a set of original document sheets, comprising:

means for inputting the desired number of sets of duplex copy sheets and generating a copy set signal in response thereto, a platen;

copying means for copying a page of an original document sheet to a side of a sheet of a copy paper when said page is disposed upon said platen;

document feeding means for feeding the original document sheets from a document tray, for placing the original document sheets on said platen, and for returning the original document sheets to said document tray;

copy paper conveying means for feeding a sheet of copy paper to said copying means, for conveying said copy paper to an intermediate tray after copying one page of an original document sheet upon a first side of said copy paper, and for conveying said copy paper from said intermediate tray to said copying means for copying another page of an original document sheet upon the second side of said copy paper;

controlling means for controlling said document feeding means, said copying means, and said copy paper conveying means so as to provide a first and a second copy mode wherein, said first copy mode comprises copying a first page of said document sheets onto a first side of a desired number of copy papers corresponding to the desired number of sets of duplex copy sheets, copying a second page of said document sheets onto a second side of said desired number of copy papers, and repeating the steps of copying a first page and copying a second page on a desired number of copy papers to copy all pages of said document sheets; and said second copy mode comprises copying every other page of said document sheets onto a first side of single ones of a plurality of copy papers, copying the remaining pages of said document sheets on a second side of single ones of said plurality of copy papers, and repeating the steps of copying every other page and copying the remaining pages until the desired number of sets of duplex copy sheets has been made; and selecting means for comparing said copy set signal with a threshold value, said threshold value representing a predetermined number of sets of duplex copy sheets, and selecting said first mode when said inputted desired number is at least said threshold value.

2. The apparatus of claim 1, wherein said document feeder includes means for reversing document sheets so that a two-sided document sheet which has a document image on both sides thereof is reversed to enable both sides to be copied.

3. The apparatus of claim 1 further comprising sorting means for sorting said sets of duplex copy sheets.

4. The apparatus of claim 1, further comprising means for determining the number of original document sheets, wherein said selecting means selects one of said first and second modes depending upon said number of original document sheets and said copy set signal.

5. The apparatus of claim 4, wherein said document feeding means includes means for counting the number of original document sheets.

6. The apparatus of claim 5, wherein said counting means counts said number of original document sheets while said document feeding means feeds all of document sheets before said copying means copies any pages of said original document sheets.

7. The apparatus of claim 1, further comprising counting means for counting the number of said original document sheets while the original document sheets are being copied in said second mode whereby one copy set of duplex copy sheets is made, wherein said selecting means selects one of said first and second mode for remaining copy sets in accordance with the number of said original document sheets and the number of the remaining copy sets.

8. The apparatus of claim 1, wherein said selecting means selects said second mode when said inputted desired number is less than said threshold value.

9. The apparatus of claim 1, further comprising means for selecting one of said first and second modes.

10. The apparatus of claim 1, further comprising means for counting a number of said document sheets, wherein, when said desired number of sets of duplex copy sheets is not larger than said threshold value, said counting means counts the number of said original document sheets while said original document sheets are being coupled in said second mode whereby one copy set of duplex copy is made, thereafter said selecting means selects one of said first and second modes for remaining copy sets in accordance with the number of said original document sheets and the number of said remaining copy sets.

11. The apparatus of claim 1 wherein said predetermined number is five.

* * * * *